United States Patent
Obrist et al.

(10) Patent No.: US 10,306,842 B2
(45) Date of Patent: Jun. 4, 2019

(54) TREE INJECTION SYSTEM AND METHODS

(71) Applicant: Syngenta Participations AG, Basel (CH)

(72) Inventors: Gerhard Obrist, Basel (CH); Peter Wyss, Basel (CH); Urs Widmer, Basel (CH)

(73) Assignee: SYNGENTA PARTICIPATIONS AG, Basel (CH)

( * ) Notice: Subject to any disclaimer, the term of this patent is extended or adjusted under 35 U.S.C. 154(b) by 451 days.

(21) Appl. No.: 15/110,766

(22) PCT Filed: Jan. 22, 2015

(86) PCT No.: PCT/EP2015/051264
§ 371 (c)(1),
(2) Date: Jul. 11, 2016

(87) PCT Pub. No.: WO2015/110535
PCT Pub. Date: Jul. 30, 2015

(65) Prior Publication Data
US 2016/0330915 A1  Nov. 17, 2016

Related U.S. Application Data

(60) Provisional application No. 61/930,470, filed on Jan. 22, 2014.

(51) Int. Cl.
*A01G 7/06* (2006.01)
*B05B 7/24* (2006.01)
*F04B 43/04* (2006.01)

(52) U.S. Cl.
CPC .............. *A01G 7/06* (2013.01); *B05B 7/2467* (2013.01); *F04B 43/04* (2013.01)

(58) Field of Classification Search
CPC .......... A01G 7/00; A01G 7/06; B05B 7/2402; B05B 7/2467; F04B 43/04
See application file for complete search history.

(56) References Cited

U.S. PATENT DOCUMENTS 3,992,813 A * 11/1976 Freshel .................. A01C 21/00
                                                        47/57.5
4,028,846 A *  6/1977 Floyd ...................... A01G 7/06
                                                        47/57.5
(Continued)

FOREIGN PATENT DOCUMENTS

WO          2012114197 A2     8/2012

OTHER PUBLICATIONS

International Search Report for International Patent Application No. PCT/EP2015/051264 dated May 6, 2015.

*Primary Examiner* — Nicolas A Arnett
(74) *Attorney, Agent, or Firm* — BakerHostetler; Toni-Junell Herbert

(57) ABSTRACT

There is provided by the present invention an injection system for use in injecting a liquid into a tree, the system comprising: (A) a liquid supply assembly (10) comprising a liquid supply inlet (34) for providing the liquid to the assembly at ambient pressure, an electric pump (68) for pressurizing and discharging the liquid from the assembly at a first pressure above ambient pressure through a liquid supply outlet (36), a pressure switch (72) connected to the supply outlet and in electrical communication with the pump for selectively actuating the pump when the pressure of the liquid supply outlet falls below said first pressure.

10 Claims, 6 Drawing Sheets

(56) References Cited

U.S. PATENT DOCUMENTS

| | | | | |
|---|---|---|---|---|
| 4,112,617 | A * | 9/1978 | Purviance | A01G 7/06 118/408 |
| 4,144,673 | A * | 3/1979 | Quast | A01G 7/06 211/107 |
| 5,031,357 | A * | 7/1991 | Macbeth | A01G 7/06 47/57.5 |
| 5,355,619 | A * | 10/1994 | West | A01G 7/06 47/48.5 |
| 5,956,894 | A * | 9/1999 | Eldridge | A01G 7/06 47/57.5 |
| 6,644,341 | B1 * | 11/2003 | Chemo | A01G 7/06 137/343 |
| 6,907,690 | B1 * | 6/2005 | Stallings | A01M 3/00 43/132.1 |
| 7,114,289 | B2 * | 10/2006 | Black | A01C 23/04 47/57.5 |
| 7,555,864 | B2 * | 7/2009 | Burgess | A01G 7/06 47/57.5 |
| 8,726,567 | B1 * | 5/2014 | Pishdadian | A01G 7/06 47/57.5 |
| 2004/0079169 | A1 | 4/2004 | Wild et al. | |
| 2005/0262763 | A1 | 12/2005 | Funk et al. | |
| 2013/0326944 | A1 * | 12/2013 | Obrist | A01G 7/06 47/57.5 |

\* cited by examiner

TREE INJECTION SYSTEM AND METHODS

RELATED APPLICATION INFORMATION

This application is a 371 of International Application No. PCT/EP2015/051264, filed 22 Jan. 2015, which claims priority to 61/930,470, filed 22 Jan. 2014, the contents of which are incorporated herein by reference herein.

The present disclosure relates generally to injecting liquid into the stem or trunk of a tree, and more particularly, this disclosure relates to injecting liquid such as a pesticides, growth regulators or nutrient and/or fertilizers into the sapwood of a tree trunk.

Arborists may inject liquids, such as insecticides, fungicides, growth regulators, nutrients and/or fertilizers, into the sapwood of tree trunks in an effort to maintain or improve the health of the trees. For example and in one of the known methods, a borehole is formed into the sapwood, thereafter the outer end of the borehole is closed by fixedly mounting a plug in the outer end of the borehole, and thereafter a needle of an injector is inserted through a septum of the plug so that the tip of the needle projects farther into the borehole than the plug. Then, the injector may discharge liquid into the borehole by way of the portion of the needle that projects farther into the borehole than the plug. The needle may be withdrawn from the plug, and the plug's septum may seal the plug so that the injected liquid is contained in the inner portion of the borehole until the injected liquid is drawn upwardly in the sapwood of the tree. Alternatively, a needleless injector used with a plug having a check valve is employed. In either case, the plug may optionally remain installed in the tree trunk for subsequent treatments by way of the plug.

For example, published PCT application WO2012114197 entitled "Tree Injection Apparatus and Methods" discloses an injector and an associated liquid supply assembly that includes a T-joint mounted between a barrel, a dosing assembly, a trigger assembly and a manifold assembly from which a supply of formulation for injection is provided from containers once they are pressurized.

Notwithstanding, the above-described tree injection equipment may be considered to be labor intensive and time consuming, such as when the tree injection formulation is decanted from a bulk product container into the tree injection equipment or potentially less hygienic when such equipment requires the use of pressurized product containers. Accordingly, there is a desire for tree injection system, apparatus and methods that provide a new balance of properties for enhanced tree management.

SUMMARY OF THE INVENTION

The following presents a simplified summary of this disclosure in order to provide a basic understanding of some aspects of this disclosure. This summary is not an extensive overview of the disclosure and is not intended to identify key or critical elements of the invention or to delineate the scope of the invention. The purpose of this section is to present some concepts of the disclosure in a simplified form as a prelude to the more detailed description that is presented later.

There is provided by the present invention an injection system for use in injecting a liquid into a tree, the system comprising: (A) a liquid supply assembly comprising a liquid supply inlet for providing the liquid to the assembly at ambient pressure, an electric pump for pressurizing and discharging the liquid from the assembly at a first pressure above ambient pressure through a liquid supply outlet, a pressure switch connected to the supply outlet and in electrical communication with the pump for selectively actuating the pump when the pressure of the liquid supply outlet falls below said first pressure.

The inventive system further comprises (B) an injection gun comprising an injector inlet in fluid communication with the liquid supply assembly (A) for receiving the liquid from the liquid supply assembly at said first pressure; an injector outlet for discharging the liquid from the injector assembly; a trigger assembly being in fluid communication with the injector inlet and the injector outlet and movable from a first position to a second position; and (C) a liquid dosage assembly for providing a metered dose of the liquid to the tree.

Advantageously, the dosage assembly (C) works cooperatively with the liquid supply system (A) and, in particular, with the pressure switch that is associated with the liquid supply system. The dosage assembly (C) comprises a first chamber for alternately being in fluid communication with the injector inlet and the injector outlet; and a second chamber that contains a gas under a second pressure above ambient pressure which is lower than said first pressure when the system is in operation. The second chamber is cooperatively associated with the first chamber such that it biases the first chamber via a piston or diaphragm arrangement when the trigger is moved from a first position, where the first chamber is in fluid communication with the injector inlet, to a second position where the first chamber is in fluid communication with the injector outlet. During operation, the respective volumes of the first and second chambers change in inverse proportion to one another both when the liquid in the first chamber is discharged through the injector outlet and also when the first chamber is re-filled with liquid received from the liquid supply assembly via the injector inlet. In this regard, the first chamber is for alternately receiving the a metered dose of the liquid from the injector inlet at said first pressure when the trigger is in the first position, and providing the metered dose of the liquid to the outlet at said second pressure when the trigger is in said second position.

Once triggered, a metered dose is injected into to the tree through the discharge nozzle at the tip of the injection gun when it is engaged with an appropriate borehole having an optional plug. A subsequent metered dose is received in to gun from the liquid supply system when the trigger returns to a starting position when a pressure differential is detected by the pressure switch and thereby selectively actuating the pump to retrieve liquid from an unpressurized supply container. The inventive system can be used with any number of known injection protocols such as, for example, those disclosed in published PCT applications WO/2012/114197 or WO/2013/149993 which are incorporated by reference herein. Suitable protocols can be those which use an injection gun with or without an injection needle and/or with or without the use of an injection plug. The appropriate protocol will depend upon various factors including the nozzle tip, the tree species, the target (insect, nematode, disease, abiotic stress, etc.), the injection liquid components and/or viscosity, the dose volume required and the injection pressure. After an injection is made, the trigger mechanism is reset to a base "untriggered" position and the pressure switch in the liquid supply assembly actuates the pump until the first chamber of the dosage assembly is refilled and ready for a subsequent injection.

A particular advantage of the inventive system is that the liquid to be injected can be provided by a standard, unpressurized product container. This reduces the chance for unwanted equipment leakage during use and attendant hygiene issues while also avoiding the need to maintain a pressurized bottle or container.

BRIEF DESCRIPTION OF THE DRAWINGS

Figure 1:
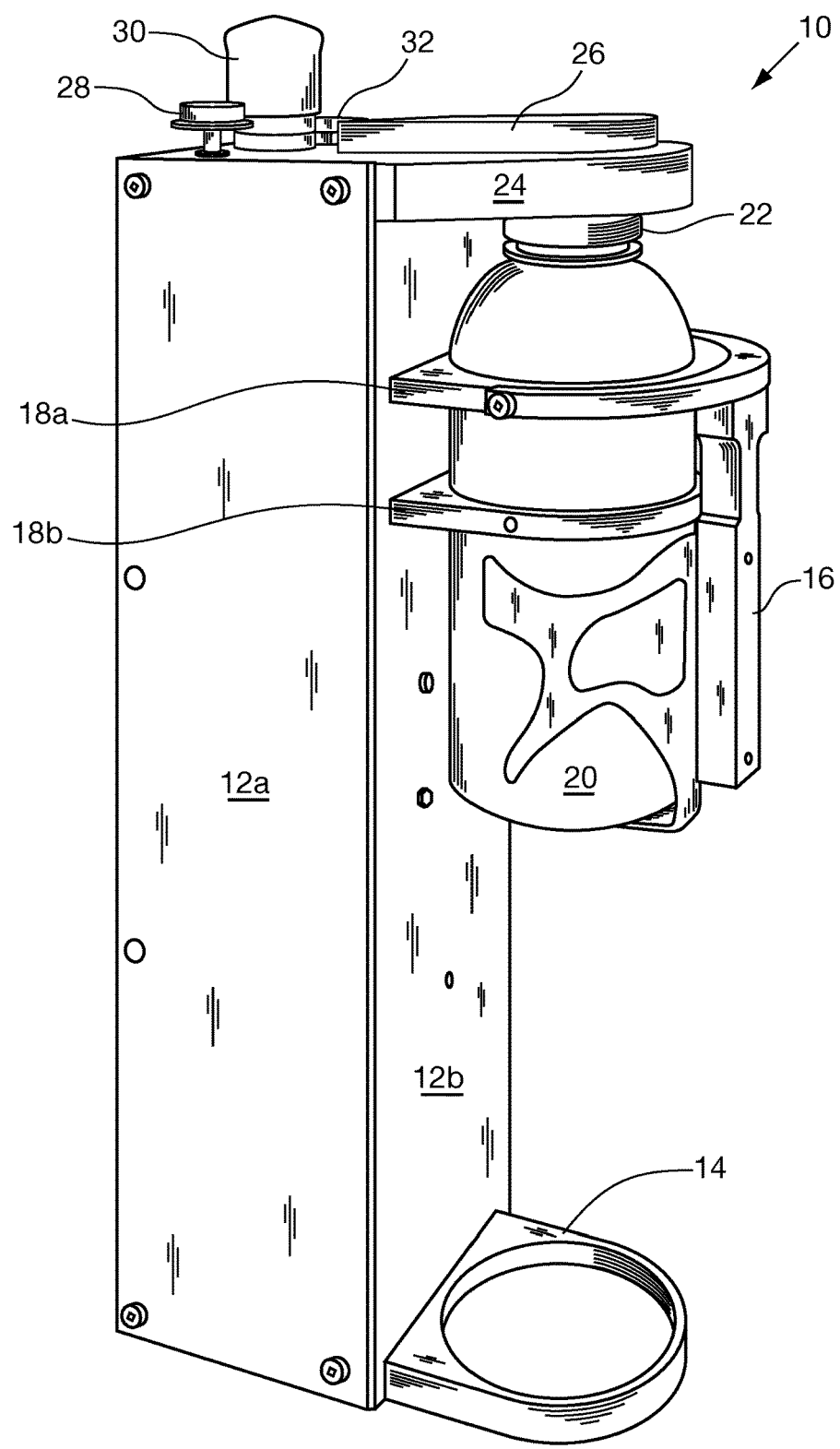
Figure 2:
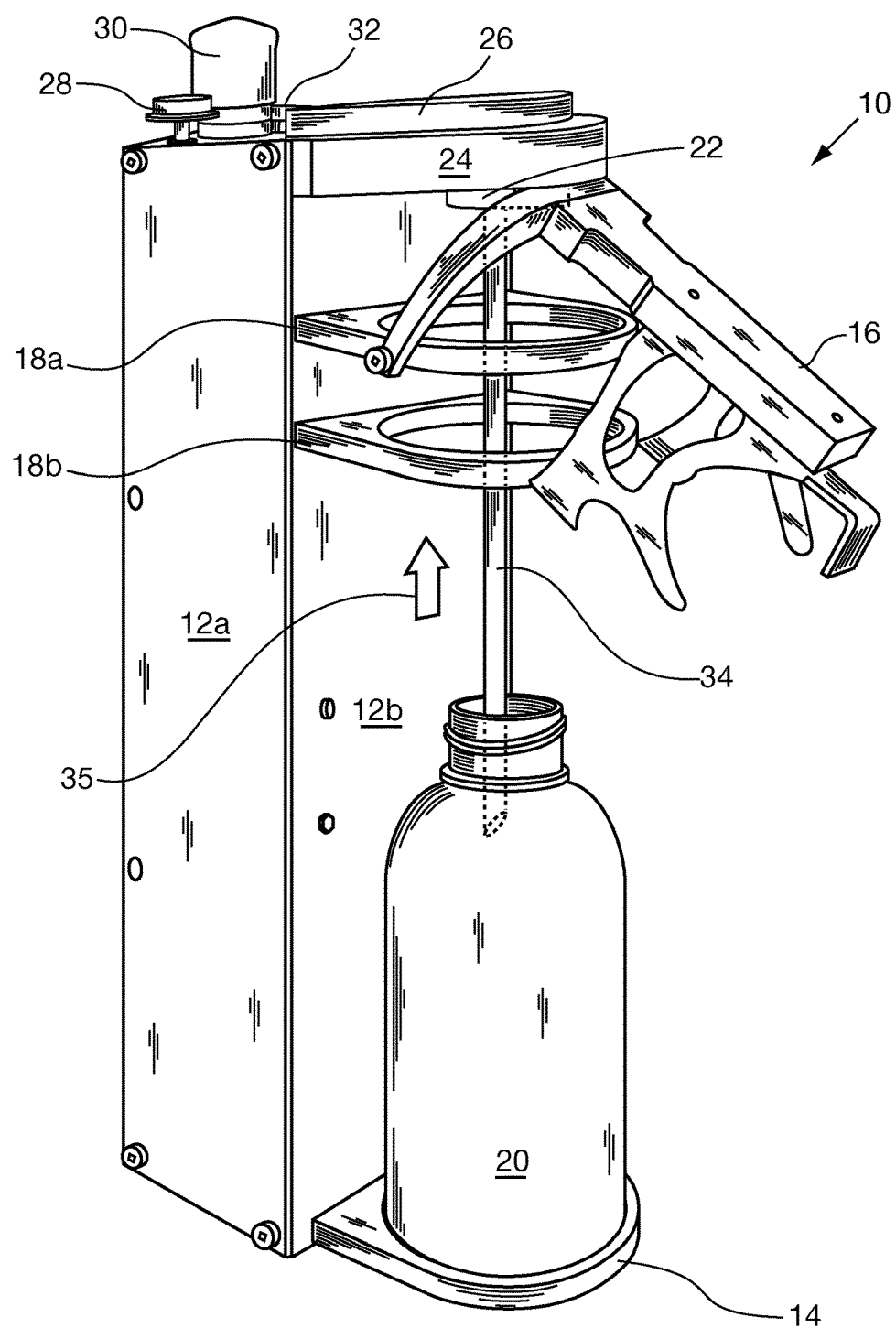
Figure 3:
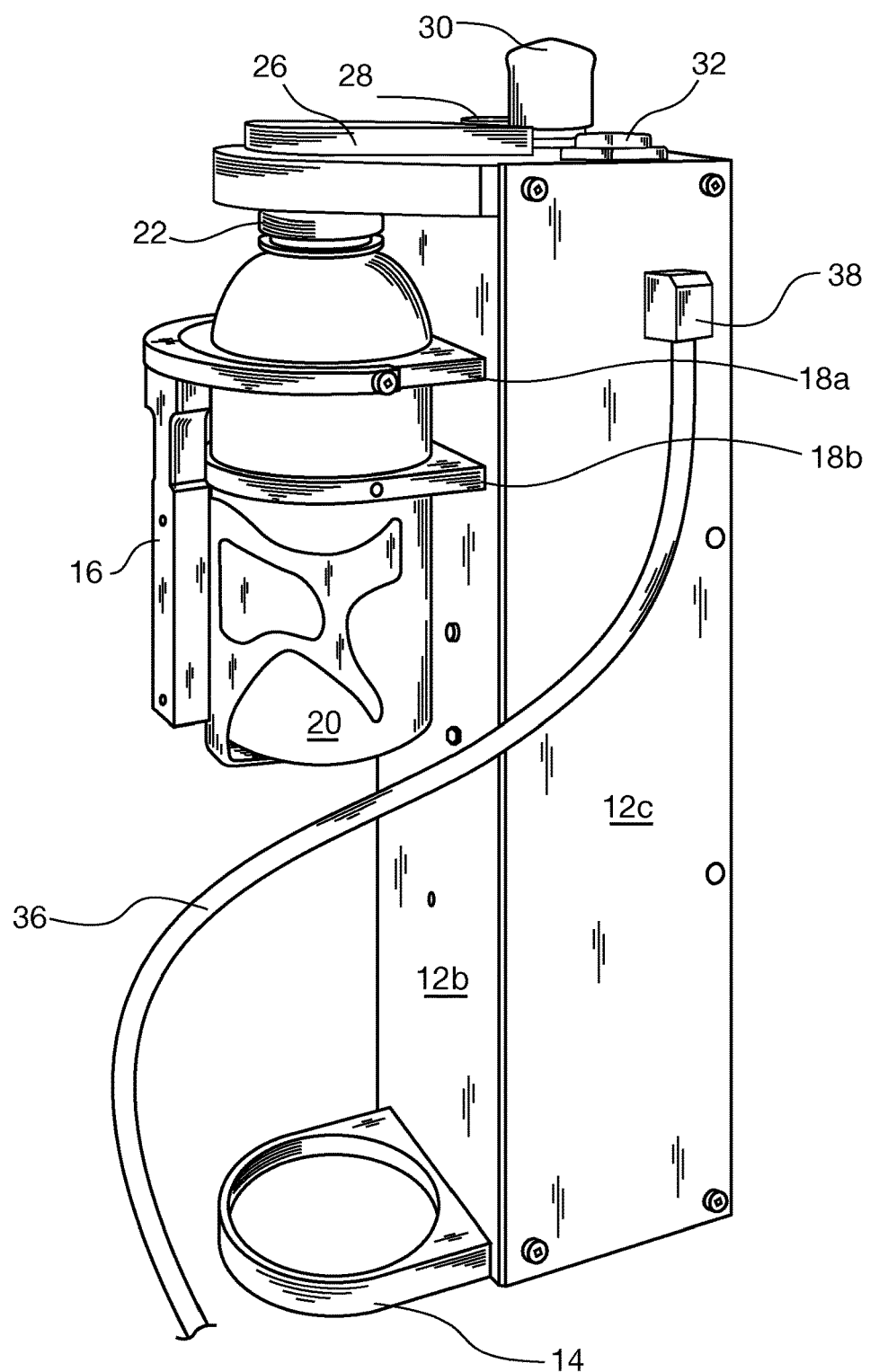
Figure 4A:
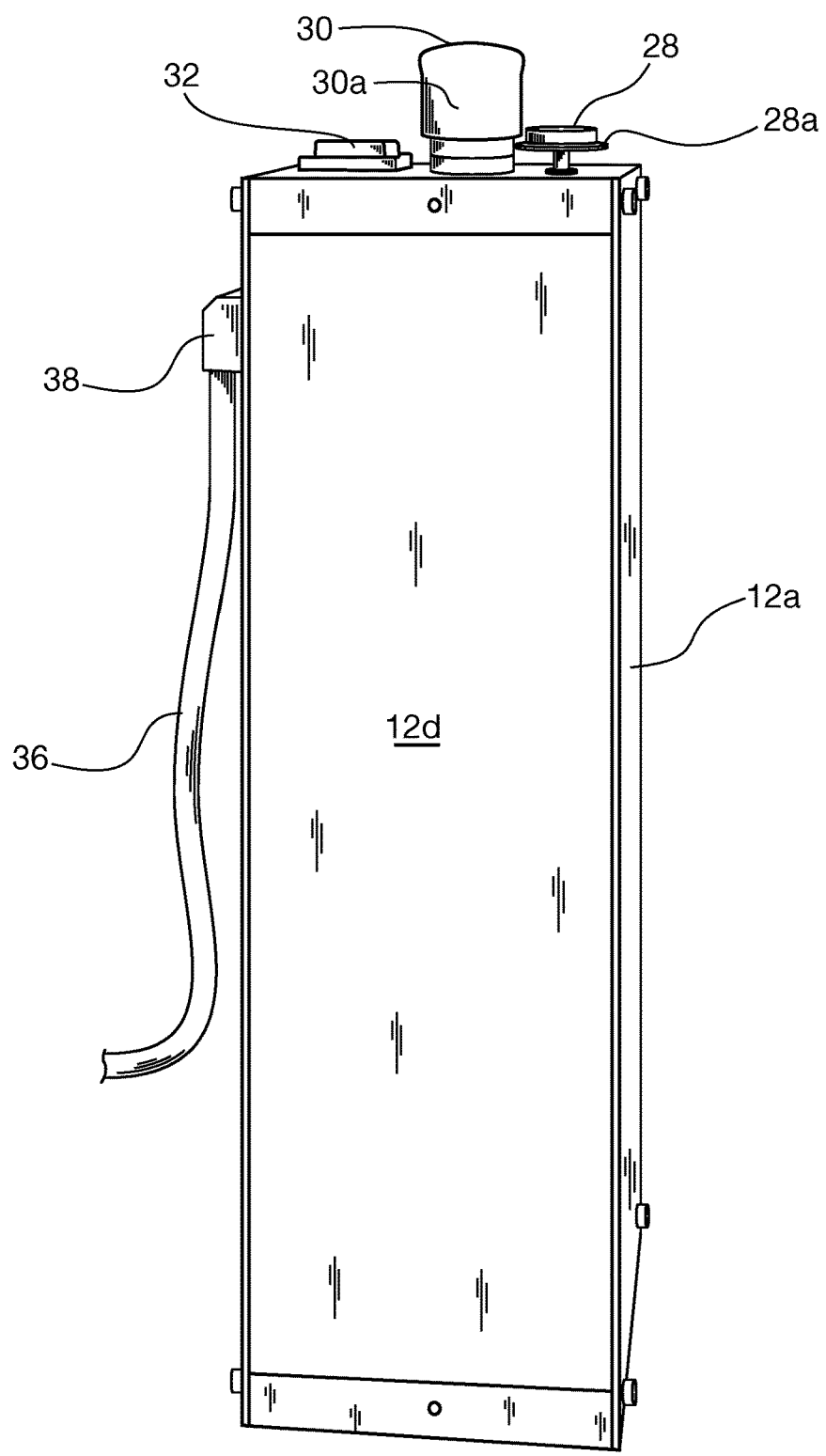
Figure 4B:
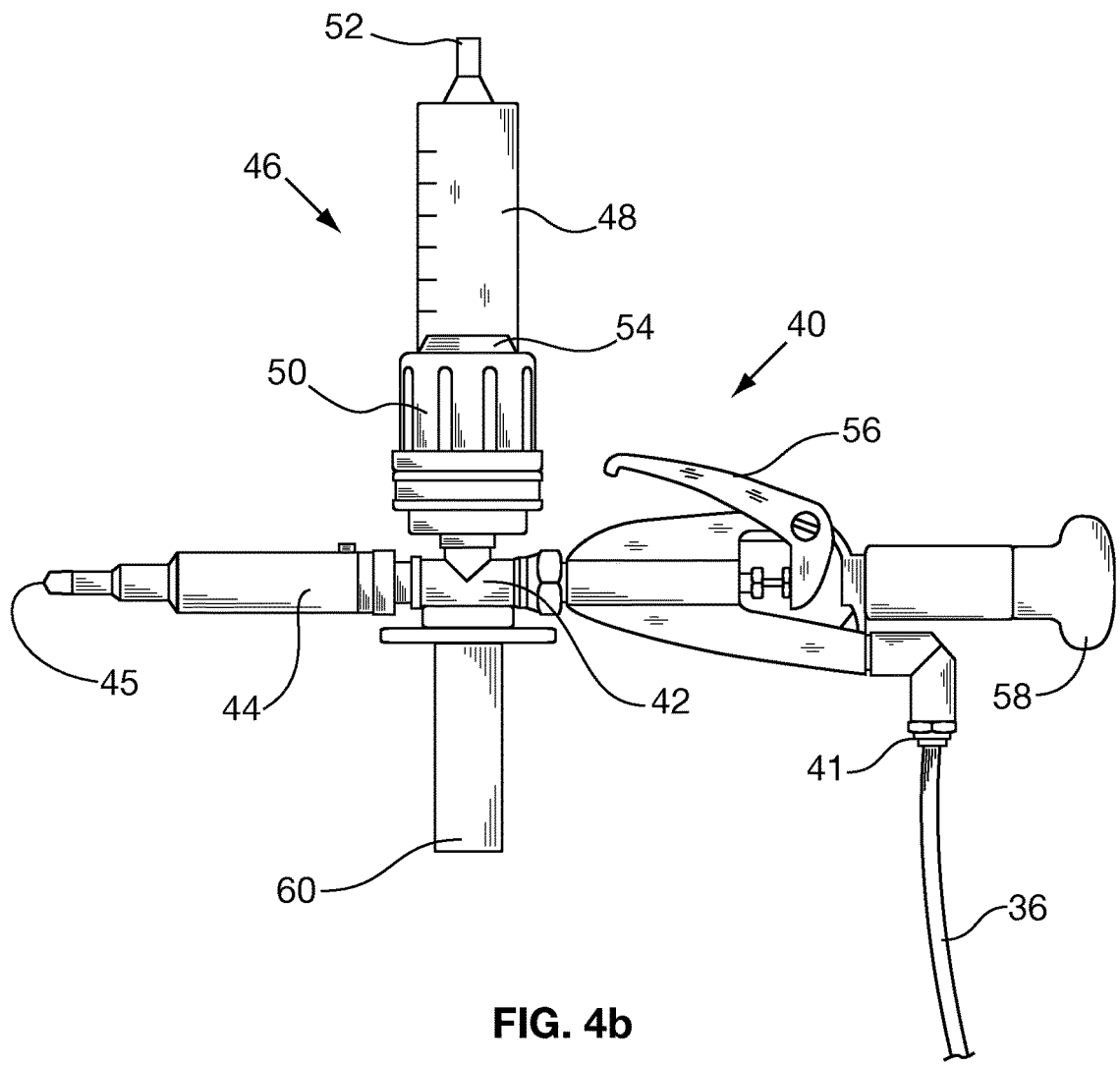
Figure 5:
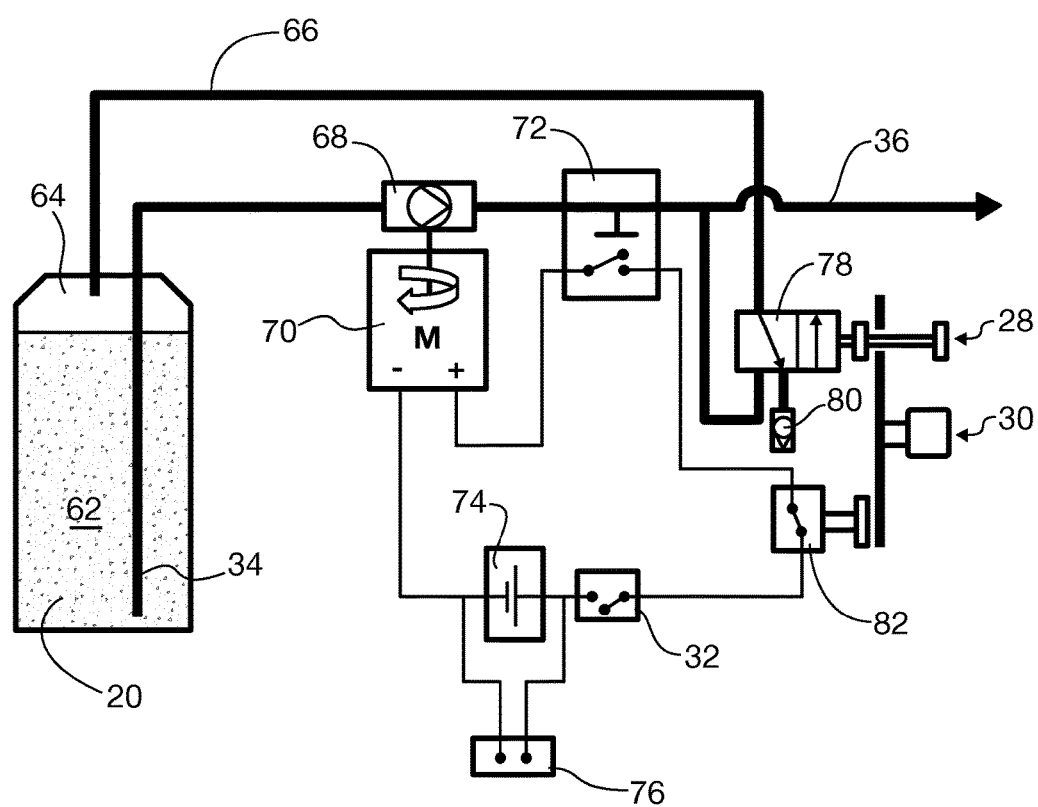

Having thus described the invention in general terms, reference will now be made to the accompanying drawings wherein:

FIG. 1 is a perspective view of a first side of a liquid supply assembly in accordance with one embodiment of the invention;

FIG. 2 is a perspective view of the liquid supply assembly shown in FIG. 1 with the product container removed from the liquid supply manifold;

FIG. 3 is a perspective view of a second side of a liquid supply assembly in accordance with one embodiment of the invention;

FIG. 4a is a front plan view of the liquid supply assembly shown in FIG. 1;

FIG. 4b is a side plan view of an injection gun assembly in accordance with one embodiment of the invention;

FIG. 5 is a schematic view of a liquid supply assembly in accordance with one embodiment of the invention.

DETAILED DESCRIPTION OF THE INVENTION

Certain exemplary embodiments of this disclosure are described below and illustrated in the accompanying figures. The embodiments described are only for purposes of illustrating the present invention and should not be interpreted as limiting the scope of the invention, which, of course, is limited only by the claims below. Other embodiments of the invention, and certain modifications and improvements of the described embodiments, will occur to those skilled in the art and all such alternate embodiments, modifications, and improvements are within the scope of the present invention.

An example of a tree injection system of the present invention is described in the following, at least initially with reference to FIGS. 1-3, in accordance with a first embodiment of this disclosure. A liquid supply system 10 includes a housing enclosure formed by side walls 12a-12d, a base including a stabilizer 14 and a top portion including a manifold cover 26 and the various control components 28, 30 and 32. The enclosure may contain various components of the liquid supply system as shown in FIG. 5 including, among others, the pump 68, motor 70, battery 74, pressure switch 72 and recirculation valve 78.

In the exemplified embodiment, a liquid container 20 such as a product bottle that contains a liquid product to be injected 62 (FIG. 5) is removably attached to the liquid supply system by removing the bottle lid (not shown) and then inserting the liquid supply inlet 34 into the top of the bottle 20 by positioning it on base 14 below the manifold 24. For example, the liquid product may be one or more of insecticides, nematacides, fungicides, growth regulators, fertilizers, nutrients and/or other liquids that are suitable for being injected into trees. After it is properly positioned, the bottle 20 is then moved upward in the direction of arrow 35 through the bottle cage 18a-18b to engage with the screw top 22 which is affixed to the bottom of manifold 24. The liquid supply inlet 34 and liquid recirculation/vent pipe 66 pass through manifold 24 to provide fluid communication with the pump 68 and bottle 20, respectively, at ambient pressure.

The bracket 16 is closed after the bottle 20 is attached to the screw top 20 after which the tree injection system may be initiated.

Turning now to FIGS. 4a-4b, to initiate the system, if not already completed earlier, the dosing chamber 50 is calibrated to receive an appropriate injection dose of the selected liquid 62 (typically below 10 ml) and then a hand air pump (not shown) may be attached to the air supply valve 52 to pressurize the air chamber 48 of the dosing assembly 46 to an injection pressure appropriate to selected injection protocol, for example, typically between 2 to 4 bars. The appropriate injection pressure will depend on the protocol and/or tree species to be interrogated by the injection system. The power switch 32 is then placed in to the on position (while making sure that the emergency cut-off switch 30 is in the off position) in order to energize the pump motor 70 and start the pump 68. The recirculation valve 78 is then opened with switch 28 (for example, for 4-5 sec) in order to charge the pump 68, i.e., until the portion of the product tube 36 within the housing is filled with liquid 62. The ambient pressure of headspace 64 during recirculation or normal operation is maintained by back pressure vent 80. In the exemplified embodiment, opening the valve 78 pumps liquid from the product bottle 20 and recirculates it back to the bottle 20 via recirculation pipe 66). The pressure switch 72 is pre-set to a pressure above the pressure of air chamber 48 so that, once the recirculation valve 78 is closed, the liquid 62 is pumped out the port 38 through tube 36 to the gun 40 via inlet 41 into the dosing chamber 50 while the trigger 56 remains in the first upward position (as shown). The dosing chamber 50 is in fluid communication with the liquid supply system 10 while the trigger 56 is in such upward position. The pressure switch 72 and dosing chamber 50 are cooperatively associated so that the pump 68 remains actuated until the dosing chamber 50 is filled. For example, the pressure switch 72 can be set to turn off the pump 68 once the liquid pressure in the system downstream of the pump 68 reaches a value that is both higher than pressure in the air chamber 48 and also indicative of a condition where the dosing chamber 50 is filled with the injection liquid 62. This can be a setting of from 5 to 7 bars, for example. Meanwhile, the pressure upstream of the pump 68 including the supply inlet 34 and the product bottle headspace 64 remain at ambient pressure.

Once the dosing chamber 50 is filled, an operator such as an arborist can take the gun 40 via palm grip 58 and handle 60 and engage the injection gun outlet 45 to a target tree via an appropriate borehole or opening. As noted above, the injection system of the invention can be used with injection protocols known in the art and the outlet 45 can be configured to accommodate a needle, to be used in needleless protocols, to set plugs, or the like, as dictated by the tree injection protocol being employed by the arborist/operator. Once the gun outlet 45 is engaged with a tree injection site, the operator will move the trigger 56 down to a second position (not shown) toward T-joint 42 of the main body of gun 40. This second trigger position closes the fluid communication of the dosing chamber 50 to the liquid supply system 10 and opens the fluid communication of the dosing chamber 50 to the gun outlet 45 via barrel 44. Once this occurs, the piston 54 is moved by the pressure in air chamber 48 (which is above ambient pressure) which pressure discharges the liquid from dosing chamber 50 through the gun outlet 45 at such pressure.

After the injection is complete the trigger 56 is released to return to the first position (for example, via a spring mechanism or the like) and the empty dosing chamber 50 is again in fluid communication with the liquid supply assembly 10. The function of the trigger can, of course, be achieved by other activation means such as switches, buttons or remotely as known to those skilled in the art. At this point, the liquid pressure in the system downstream of the pump 68 is provided by the pressure in air chamber 48. In accordance with an embodiment of the invention, as the pressure in air chamber 48 is lower that the value selected for the pressure switch 72, the switch 72 actuates the pump 68 until the pressure returns to a pre-set value above ambient pressure that also corresponds to a pressure where the dosing chamber 50 is in a filled condition. Accordingly, use of the injection system of the invention requires significantly less time to inject multiple trees and/or trees with multiple injection sites as the dosing chamber can be emptied and filled quickly and automatically in rapid succession until the product bottle 20 is emptied or until the battery 74 is discharged. A discharged battery 74 can be recharged from a fixed or mobile power source via charging jack 76. Moreover, empty product bottles 20 can be quickly replaced with a filled bottle 20 without turning off the system as the bottle and manifold 24 remain at ambient pressure. The tree injection system of the invention also avoids the need for decanting liquid product and for use of pressurized product bottles which improves operator safety and hygiene.

In the event of unforeseen circumstances, as shown in the exemplified embodiment, the system can be reset by pushing down on the switch cap 30a of the emergency cut-off switch 30. The cut-off switch 30 activates both the emergency electric switch 82 which turns off the pump motor 70 and also opens the recirculation valve 78. In the exemplified embodiment, the recirculation valve is opened when the switch cap 30a engages with lip 28a of the recirculation valve switch 28. Once this occurs, the downstream system pressure is provided by the air chamber 48 of the dosing assembly 46 which recirculates much of the liquid present in the gun 40 and line 36 back to the product bottle 20.

By way of summary, the schematic of FIG. 5 discloses a product container 20 maintained at ambient pressure that contains tree injection liquid 62 which is pumped by pump 68 from liquid supply line 34 via supply tube 36 to the tree injection gun jet 40 at a selected pressure above ambient pressure and above the pressure in the air chamber 48 (which is also set above ambient pressure). During operation of the pump 68, the headspace 64 of bottle 20 is maintained at ambient pressure (sometimes via operation of valve 80 and vent pipe 66) as liquid 62 is pumped from the bottle 20 and discharged through outlet 36 at a pressure above ambient pressure. The pump 68 is suitably a membrane pump that is selectively activated after the gun jet 40 is triggered to release liquid from the dosing chamber 46, guided by a pressure valve 72 which stops the pump when the line pressure reaches a pre-set limit (e.g., 4-7 bars, more particularly 5-7 bars, or from 5 to 6 bars); suitably, the limit is selected to correspond with the dosing chamber 48 being in a filled condition. In one embodiment, the pump and other electric components are energized by a battery 74. After operation, the main power switch 32 is switched off. To clean the system, the product bottle 20 can be replaced with a water bottle and the system is turned on. The tubes 34/36 and the injection gun 40 can be rinsed by several discharges of water through the injection gun 40. Suitably, the discharged rinsing water is to be collected in a marked waste bottle for appropriate disposal.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

We claim:
1. An injection system for use in injecting a liquid into a tree, the system comprising:
   (A) a liquid supply assembly comprising:
      a liquid supply inlet for providing the liquid to the assembly at ambient pressure,
      an electric pump for pressurizing and discharging the liquid from the assembly at a first pressure above ambient pressure through a liquid supply outlet,
      a pressure switch connected to the supply outlet and in electrical communication with the pump for selectively actuating the pump when the pressure of the liquid supply outlet falls below said first pressure;
   (B) an injection gun comprising:
      an injector inlet in fluid communication with the liquid supply assembly for receiving the liquid from the liquid supply assembly at said first pressure;
      an injector outlet for discharging the liquid from the injector assembly;
      a trigger assembly being in fluid communication with the injector inlet and the injector outlet and movable from a first position to a second position;
   (C) a liquid dosage assembly for providing a metered dose of the liquid to the tree comprising
      a first chamber for alternately being in fluid communication with the injector inlet and the injector outlet; and
      a second chamber cooperatively associated with the first chamber that is adapted to contain a gas under a second pressure above ambient pressure that biases the first chamber so that volumes of the first and second chambers change in inverse proportion to one another
      wherein the first chamber is for alternately receiving the a metered dose of the liquid from the injector inlet at said first pressure when the trigger is in the first position, and providing the metered dose of the liquid to the outlet at said second pressure when the trigger is in said second position; and
      wherein the pressure switch is set to actuate the pump when the first pressure is greater than the second pressure and/or corresponding to a condition when the first chamber is filled with liquid.

2. The system according to claim 1, wherein the liquid supply inlet further comprises a liquid supply manifold for removably receiving a liquid supply container.

3. The system according to claim 2, wherein the liquid supply container is attached to the manifold with a screw cap and a mounting bracket.

4. The system according to claim 2, wherein a liquid supply inlet and a liquid recirculation pass through manifold to provide fluid communication between the pump and product bottle at ambient pressure.

5. The system according to claim 1, wherein the liquid supply assembly further comprises a recirculation valve to facilitate charging the pump and to maintain the manifold and product bottle at ambient pressure during operation.

6. The system according to claim 5, wherein the recirculation valve further comprises a back-pressure valve.

7. The system according to claim 1, wherein the electric pump is a membrane pump that is selectively activated by a pressure valve after the injection gun is triggered to release liquid from the dosage assembly.

8. The system according to claim 1, which further comprises a cut-off switch that turns off the pump motor and opens the recirculation valve.

9. The system according to claim 1, wherein the first pressure is from 4 to 7 bars and is greater than the second pressure.

10. The system according to claim 1, wherein the second pressure is from 2 to 4 bars and is less than the first pressure.

* * * * *